(12) United States Patent
Nitta

(10) Patent No.: US 10,014,547 B2
(45) Date of Patent: Jul. 3, 2018

(54) FLOW BATTERY

(71) Applicant: TOYOTA JIDOSHA KABUSHIKI KAISHA, Toyota-shi, Aichi-ken (JP)

(72) Inventor: Iwao Nitta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 15/264,288

(22) Filed: Sep. 13, 2016

(65) Prior Publication Data

US 2017/0117569 A1 Apr. 27, 2017

(30) Foreign Application Priority Data

Oct. 21, 2015 (JP) .................................. 2015-207383

(51) Int. Cl.
*H01M 8/18* (2006.01)
*H01M 8/04186* (2016.01)
*H01M 8/20* (2006.01)
*H01M 12/08* (2006.01)

(52) U.S. Cl.
CPC ....... *H01M 8/188* (2013.01); *H01M 8/04186* (2013.01); *H01M 8/18* (2013.01); *H01M 8/20* (2013.01); *H01M 12/08* (2013.01); *H01M 2300/0028* (2013.01); *Y02E 60/528* (2013.01)

(58) Field of Classification Search
CPC ................................ H01M 8/18; H01M 8/188
See application file for complete search history.

(56) References Cited

FOREIGN PATENT DOCUMENTS

| JP | 2011-258489 A | 12/2011 |
|---|---|---|
| JP | 2012-028017 A | 2/2012 |
| JP | 2013-026142 A | 2/2013 |
| JP | 2014-137898 A | 7/2014 |

*Primary Examiner* — Olatunji Godo
(74) *Attorney, Agent, or Firm* — Oliff PLC

(57) ABSTRACT

A flow battery that prevents discharge inhibition caused by lithium-containing deposits produced with chemical oxidation of mediator. Flow battery includes: anode including anode current collector having lithium element on a surface thereof; cathode including cathode current collector; separator disposed between anode and cathode; electrolyte including mediator having function as a redox couple; discharger including reductor and anode chamber, reductor being defined by separator, housing cathode and electrolyte and being configured to reduce the mediator, anode chamber housing the anode defined by separator; first flow channel and second flow channel, flow channels being connected to reductor; oxidizer connected to first and second flow channels; configured to chemically oxidize the mediator; circulator configured to circulate electrolyte to reductor, first flow channel, oxidizer and second flow channel in this order, wherein a trap configured to trap lithium-containing deposits produced with oxidation of mediator, disposed in part of the second flow channel or oxidizer.

6 Claims, 4 Drawing Sheets

Filter

Lithium-containing deposits

Lithium-containing deposits    Electrolyte withdrawal valve

FLOW BATTERY

TECHNICAL FIELD

The disclosure relates to a flow battery.

BACKGROUND

A flow battery is a battery in which a redox couple (mediator) is reacted, and it is not a battery in which a reductant and an oxidant are directly reacted in at least one electrode.

A lithium semi-redox flow battery is disclosed in Patent Literature 1. The flow battery comprises a combination of the cathode of a redox flow battery and an anode that uses lithium as an active material, and the flow battery is able to regain a cathode active material by both of electrical charging and chemical oxidation caused by addition of an oxidant.

Patent Literature 1: Japanese Patent Application Laid-Open No. 2013-26142

SUMMARY

However, it was found that in the flow battery using a lithium element as the anode active material, depending on the structure or the state of use of the battery, lithium-containing deposits may be produced upon the chemical oxidation of a mediator reduced by discharge. Once the lithium-containing deposits reach the cathode, they attach to the surface of a cathode current collector, decrease the reaction area and inhibit discharge. Therefore, the flow battery has a problem of a decrease in power output.

The disclosed embodiments were achieved in light of the above circumstance. An object of the disclosed embodiments is to provide a flow battery that is able to prevent discharge inhibition caused by lithium-containing deposits produced with the chemical oxidation of a mediator.

The flow battery according to the disclosed embodiments comprises: an anode comprising an anode current collector having a lithium element on a surface thereof; a cathode comprising a cathode current collector; a separator disposed between the anode and the cathode; an electrolyte comprising a mediator having a function as a redox couple; a discharger comprising a reductor and an anode chamber, the reductor being defined by the separator, housing the cathode and the electrolyte and being configured to reduce the mediator, and the anode chamber housing the anode defined by the separator; a first flow channel and a second flow channel, the flow channels being connected to the reductor; an oxidizer connected to the first and second flow channels and configured to chemically oxidize the mediator; and a circulator configured to circulate the electrolyte to the reductor, the first flow channel, the oxidizer and the second flow channel in this order, wherein a trap configured to trap lithium-containing deposits produced with oxidation of the mediator, is disposed in at least a part of the second flow channel or oxidizer.

In the disclosed embodiments, the mediator may comprise a vanadium element or iron element.

In the disclosed embodiments, a filter may be used in the trap.

In the disclosed embodiments, an electrolyte withdrawal valve configured to withdraw the electrolyte containing the lithium-containing deposits, may be used in the trap.

In the disclosed embodiments, the mediator may be oxidized by use of an oxygen-containing gas.

In the disclosed embodiments, the electrolyte may be a non-aqueous electrolyte containing a catalyst, an organic solvent and the mediator; the mediator may be a polyoxometalate containing vanadium; and the catalyst may be selected from the group consisting of manganese acetate, manganese (II) acetylacetonato, manganese (III) acetylacetonato, copper (I) chloride, scandium trifluoromethanesulfonate, cobalt (II) porphyrin, zinc chloride, iron (II) chloride, manganese (II) chloride, vanadyl acetylacetonato and palladium acetate.

According to the disclosed embodiments, the flow battery that is able to prevent the discharge inhibition by trapping the lithium-containing deposits produced upon the chemical oxidation of the reduced mediator before they reach the cathode, can be provided.

DETAILED DESCRIPTION

The flow battery according to the disclosed embodiments comprises: an anode comprising an anode current collector having a lithium element on a surface thereof; a cathode comprising a cathode current collector; a separator disposed between the anode and the cathode; an electrolyte comprising a mediator having a function as a redox couple; a discharger comprising a reductor and an anode chamber, the reductor being defined by the separator, housing the cathode and the electrolyte and being configured to reduce the mediator, and the anode chamber housing the anode defined by the separator; a first flow channel and a second flow channel, the flow channels being connected to the reductor; an oxidizer connected to the first and second flow channels and configured to chemically oxidize the mediator; and a circulator configured to circulate the electrolyte to the reductor, the first flow channel, the oxidizer and the second flow channel in this order, wherein a trap configured to trap lithium-containing deposits produced with oxidation of the mediator, is disposed in at least a part of the second flow channel or oxidizer.

In the flow battery of the disclosed embodiments, the lithium-containing deposits produced in the chemical oxidation process to regain the reduced mediator produced by discharge into the oxidized mediator, can be trapped before the deposits reach the cathode.

The basic configuration of the flow battery of the disclosed embodiments will be described by reference to FIG. 1.

Figure 1:
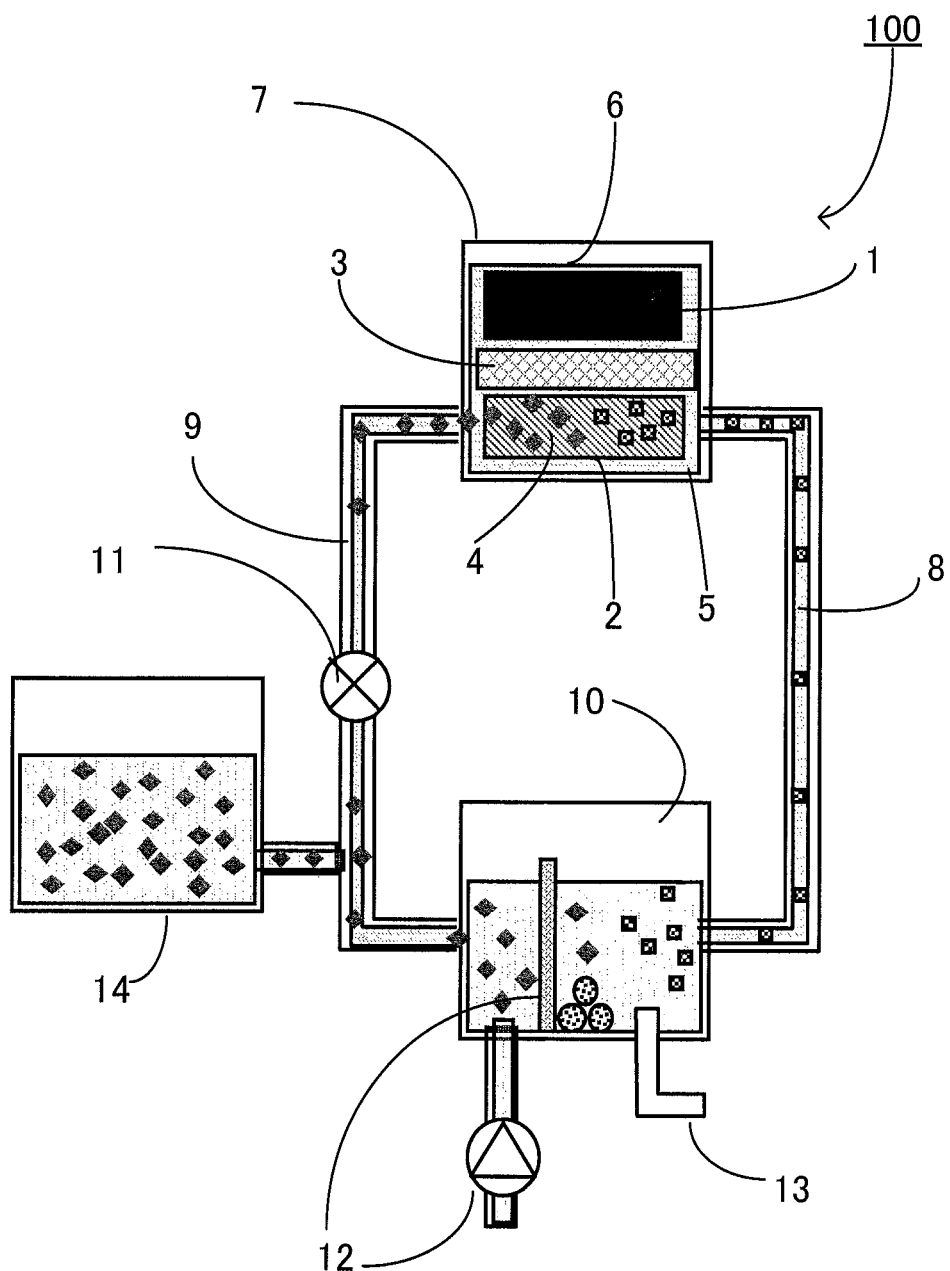
FIG. 1 is a schematic view of an example of the configuration of the flow battery according to an embodiment.

As shown in FIG. 1, the basic configuration of a flow battery 100 according to the disclosed embodiments include: an anode 1 comprising an anode current collector having a lithium element on a surface thereof; a cathode 2 comprising a cathode current collector; a separator 3 disposed between the anode 1 and the cathode 2; an electrolyte 4 comprising a mediator having a function as a redox couple; a reductor 5 being defined by the separator 3 and housing the cathode 2 and the electrolyte 4; an anode chamber 6 housing the anode 1 defined by the separator 3; a discharger 7 comprising the reductor 5 and the anode chamber 6; a first flow channel 8 and a second flow channel 9, the flow channels being connected to the reductor 5; an oxidizer 10 connected to the first flow channel 8 and the second flow channel 9; a circulator 11 configured to circulate the electrolyte 4; and a trap 12 disposed in at least a part of the second flow channel 9 or the oxidizer 10.

The flow battery 100 of the disclosed embodiments is a flow battery in which the mediator is reacted on the cathode 2 side. The flow battery 100 includes a cell in the discharger 7, the cell comprising the anode 1, the cathode 2 and the separator 3 that is disposed between the anode 1 and the cathode 2 and is configured to allow Li ions to pass through. In FIG. 1, the cell is schematically shown as a single cell. However, it may be a cell assembly comprising a plurality of cells. Examples of the cell assembly include a cell stack comprising stacked flat plate cells.

The anode 1 and the cathode 2 are electrically connected to a load.

The anode 1 comprises the anode current collector having a lithium element on the surface thereof as an active material. The lithium element on the surface of the anode current collector may be a generally-used Li metal, an Li ion-intercalated carbonaceous material, an Li alloy or the like. Of them, from the viewpoint of energy density, the lithium element may be an Li metal. The material for the anode current collector is not particularly limited, as long as it has electroconductivity. The material may be an electrochemically and chemically stable material.

The cathode 2 includes the cathode current collector. The material for the cathode current collector may be a material that is able to efficiently transfer electrons and reaction species in the circulating electrolyte 4 and that is electrochemically and chemically stable. Examples of the material include carbon paper and metal mesh. The material may be glassy carbon.

The separator 3 is impermeable to the electrolyte 4 and able to conduct Li ions. The material for the separator 3 is not particularly limited. Examples of the material include Li ion-conductive solid electrolytes such as a non-aqueous polymer electrolyte, an oxide solid electrolyte and a glass electrolyte.

The electrolyte 4 comprises the mediator configured to function as a redox couple.

The type of the mediator is not particularly limited. Considering stability, etc., the mediator may comprise a vanadium element or iron element. The mediator comprising a vanadium element may be a polyoxometalate containing vanadium.

The polyoxometalate containing vanadium (V-POM) used in the disclosed embodiments is not particularly limited. From the viewpoint of ease of developing an oxidation-reduction reaction, it may be a compound represented by the general formula $H_xLM_yV_zO_{40}$ (where L is P, Si or B, and M is Mo or W). Also, it may be a compound represented by the general formula $H_5PMo_{10}V_2O_{40}$, $H_{10}SiV_3W_4O_{40}$ or $H_7SiV_3W_{12}O_{40}$.

The iron element-containing mediator used in the disclosed embodiments is not particularly limited. Examples of the mediator include $Fe_3(PW_9O_{37})$, $TBA_3H_3Fe_3PW_9O_{37}$ and $Fe(OH_2)_2Fe_2(P_2W_{15}O_{56})_2$.

The amount of the mediator dissolved in the electrolyte 4 is determined from the relationship between reaction rate and viscosity. Therefore, it may be appropriately determined from desired current density or electrolyte flow rate.

The type of the solvent used for the electrolyte 4 is not particularly limited. Due to having a wide potential window, the solvent may be a non-aqueous solvent, or it may be an organic solvent. As the organic solvent, an organic solvent which is able to stably dissolve the mediator in high concentration and which is stable to lithium metal, is used. Examples of such an organic solvent include anisole, dimethoxyethane, propylene carbonate, acetonitrile and dimethylsulfoxide (hereinafter may be referred to as DMSO). In the case of using the above-mentioned V-POM, from the viewpoint of solubility, the organic solvent may be acetonitrile or DMSO. Of them, the solvent may be DMSO.

An electrolyte salt is used for the electrolyte 4 of the disclosed embodiments. The electrolyte salt is not particularly limited, as long as it is a lithium salt that is soluble in the above-mentioned solvent. As the electrolyte salt, lithium trifluoromethanesulfonate, lithium acetate, lithium perchlorate, lithium nitrate or the like may be used.

The electrolyte 4 may contain a catalyst for oxidizing the mediator. In the case of using a polyoxometalate containing vanadium as the mediator, the catalyst may be selected from the group consisting of manganese acetate, manganese (II) acetylacetonato, manganese (III) acetylacetonato, copper (I) chloride, scandium trifluoromethanesulfonate, cobalt (II) porphyrin, zinc chloride, iron (II) chloride, manganese (II) chloride, vanadyl acetylacetonato and palladium acetate.

The reductor 5 is defined by the separator 3, houses the cathode 2 and the electrolyte 4, and serves as a reaction site where the mediator is reduced by a discharge reaction.

The anode chamber 6 houses the anode 1 defined by the separator 3. It serves as a reaction site where the lithium element is oxidized by a discharge reaction.

The anode 1 is separated from the reductor 5 by the separator 3; therefore, the electrolyte 4 does not leak to the anode 1 side.

The discharger 7 include the reductor 5 and the anode chamber 6. As described above, in accordance with the discharge reaction in the discharger 7, the mediator is reduced in the reductor 5.

The first flow channel 8 and the second flow channel 9 are connected to the reductor 5 and the oxidizer 10 to circulate the electrolyte 4 inside the flow battery 100. The circulator is disposed so as to circulate the electrolyte 4 to the reductor 5, the first flow channel 8, the oxidizer 10 and the second flow channel 9 in this order. A general liquid pump or the like may be used in the circulator 11.

In the oxidizer 10, the mediator is chemically oxidized. For the chemical oxidation of the mediator, an oxidant is used. The oxidant used is not particularly limited and may be a liquid, solid or gaseous compound.

In the case of using a solid or liquid compound as the oxidant, hydrogen peroxide solution, sulfuric acid, silver oxide or the like may be used.

In the case of using a gas as the oxidant, halogen gas, ozone or the like may be used. In general, an oxygen-containing gas such as air is used.

An oxidant supplier 13 may be disposed in the oxidizer 10.

When the oxidant is a liquid or solid compound, the compound is supplied as it is to the electrolyte 4, or it is supplied to the electrolyte 4 in the state of being dispersed or dissolved in the solvent.

When the oxidant is a gas, the gas is supplied to the electrolyte filled in the oxidizer 10. The gas may be supplied by blowing or bubbling, for example. In the case of supplying the gas by bubbling, to increase the gas-liquid reaction area of the electrolyte and oxygen, a bubbler, which is able to produce fine bubbles, may be used.

The first flow channel 8 or the second flow channel 9 may include an electrolyte container 14 so that the amount of the supplied mediator and so on can be controlled in response to fluctuations in battery power output, etc.

In the flow battery of the disclosed embodiments, the trap 12 configured to trap the lithium-containing deposits produced with the oxidation of the mediator, may be disposed in at least a part of the second flow channel 9 or the oxidizer 10.

Depending on battery configuration and/or operating conditions, the lithium-containing compound produced with the oxidation of the mediator in the oxidizer 10 may be insoluble and deposit in the electrolyte. Examples of the lithium-containing deposits produced with the oxidation of the mediator include lithium oxide, lithium peroxide, lithium hydroxide and lithium carbonate.

Once the lithium-containing deposits reach the cathode 2, they attach to the surface of the cathode current collector, decrease the reaction area and inhibit discharge. Therefore, the flow battery has a problem of a decrease in power output. In the disclosed embodiments, therefore, the lithium-containing deposits are trapped by the disposed trap 12.

In the disclosed embodiments, the trap 12 is disposed in at least a part of the oxidizer 10 or the second flow channel 9 that is close to the reaction site where the lithium-containing deposits are produced. Therefore, the lithium-containing deposits can be trapped before they reach the cathode 2, and they can be trapped in the state where the content of the lithium-containing deposits is large.

Figure 2:
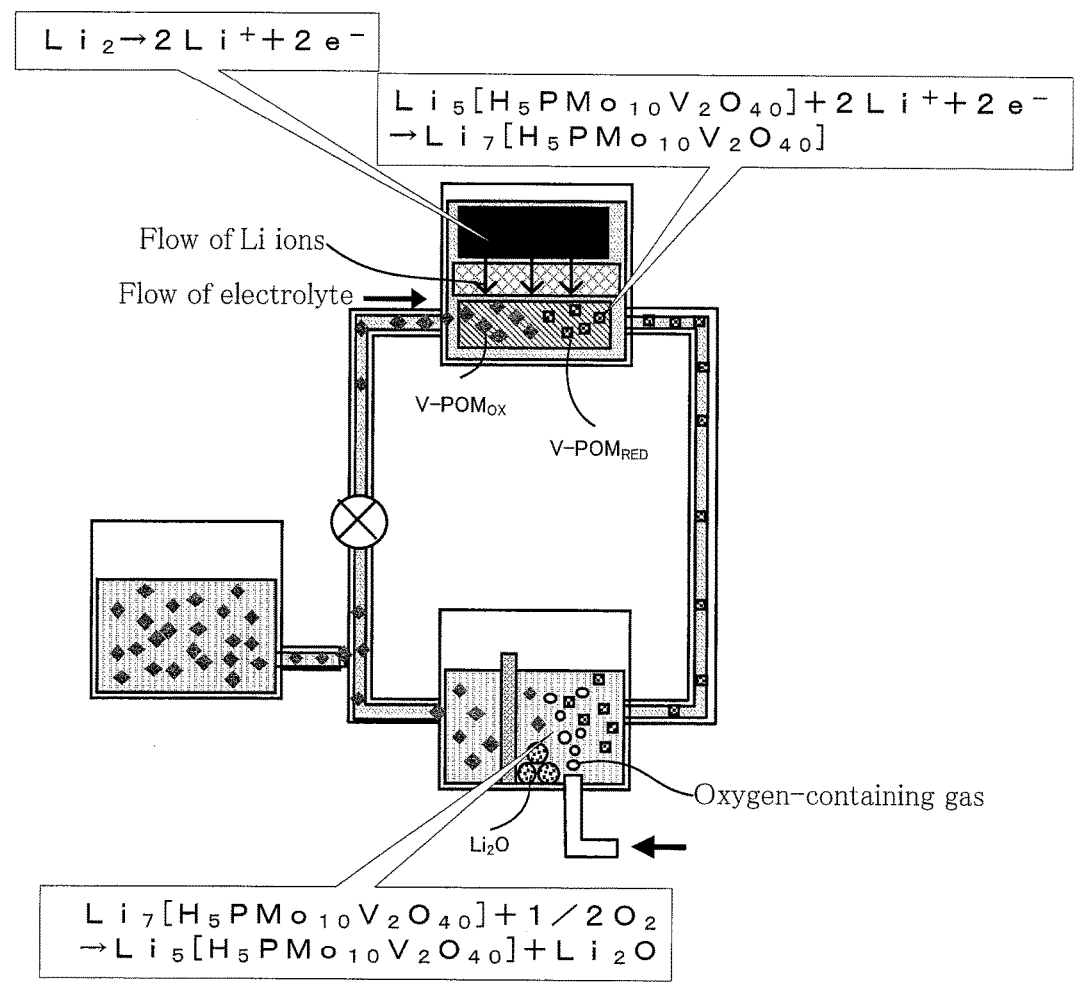
FIG. 2 shows an overview of an example of the operational state of the flow battery according to an embodiment.

Next, with reference to FIG. 2, the operating conditions of the flow battery of the disclosed embodiments and the process of producing the lithium-containing deposits with the oxidation of the mediator (V-POM) will be described using, as an example, the case where the Li metal is used as the anode active material and the oxygen-containing gas is used as the oxidant.

In the anode, the Li metal is oxidized in accordance with the following formula (1):

$$2Li \rightarrow 2Li^+ + 2e \quad \text{Formula (1)}$$

The Li ions produced in the anode pass through the separator and move to the cathode. The electrons go through an external circuit via a load and move to the cathode.

In the reductor housing the cathode, the oxidized V-POM$_{Ox}$(Li$_5$[H$_5$PMo$_{10}$V$_2$O$_{40}$]), which is the mediator, reacts with the Li ions, which have passed through the separator and moved to the reductor, and the electrons, which have gone through the external circuit and moved to the cathode. Therefore, the oxidized V-POM$_{Ox}$ is reduced to a Li-coordinated reduced V-POM$_{Red}$(Li$_7$[H$_5$PMo$_{10}$V$_2$O$_{40}$]) in accordance with the following formula (2):

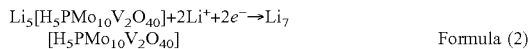

$$Li_5[H_5PMo_{10}V_2O_{40}] + 2Li^+ + 2e^- \rightarrow Li_7[H_5PMo_{10}V_2O_{40}] \quad \text{Formula (2)}$$

The electrolyte containing the reduced V-POM$_{Red}$ flows from the reductor to the oxidizer through the first flow channel.

In the oxidizer, once the oxygen-containing gas is supplied from the oxidant supplier to the electrolyte containing the reduced V-POM$_{Red}$, the reduced V-POM$_{Red}$ is chemically oxidized in accordance with the following formula (3):

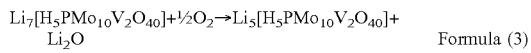

$$Li_7[H_5PMo_{10}V_2O_{40}] + \tfrac{1}{2}O_2 \rightarrow Li_5[H_5PMo_{10}V_2O_{40}] + Li_2O \quad \text{Formula (3)}$$

In the oxidizer, at least part of V-POM$_{Red}$ is oxidized. The electrolyte containing the resulting V-POM$_{Ox}$ flows from the oxidizer to the reductor through the second flow channel.

As a result of balancing the formulae (1) to (3), the entire reaction of the flow battery system is represented by the following formula (4):

$$2Li + \tfrac{1}{2}O_2 \rightarrow Li_2O \quad \text{Formula (4)}$$

The lithium oxide (Li$_2$O) produced with the chemical oxidation of the mediator shown by the formula (3) is insoluble in the electrolyte.

The type and size of the lithium-containing deposits (e.g., lithium oxide) produced in this way vary depending on battery configuration and discharge conditions. It is difficult to control the condition of the flow battery so as not to produce the lithium-containing deposits.

The flow battery of the disclosed embodiments can prevent the discharge inhibition by trapping the insoluble lithium-containing deposits produced upon the chemical oxidation of the reduced mediator before they reach the cathode.

Hereinafter, examples of the trap will be explained in terms of the size of the lithium-containing deposits produced with the chemical oxidation of the mediator. However, the trap in the flow battery of the disclosed embodiments is not limited to the following examples.

First Example

Figure 3:
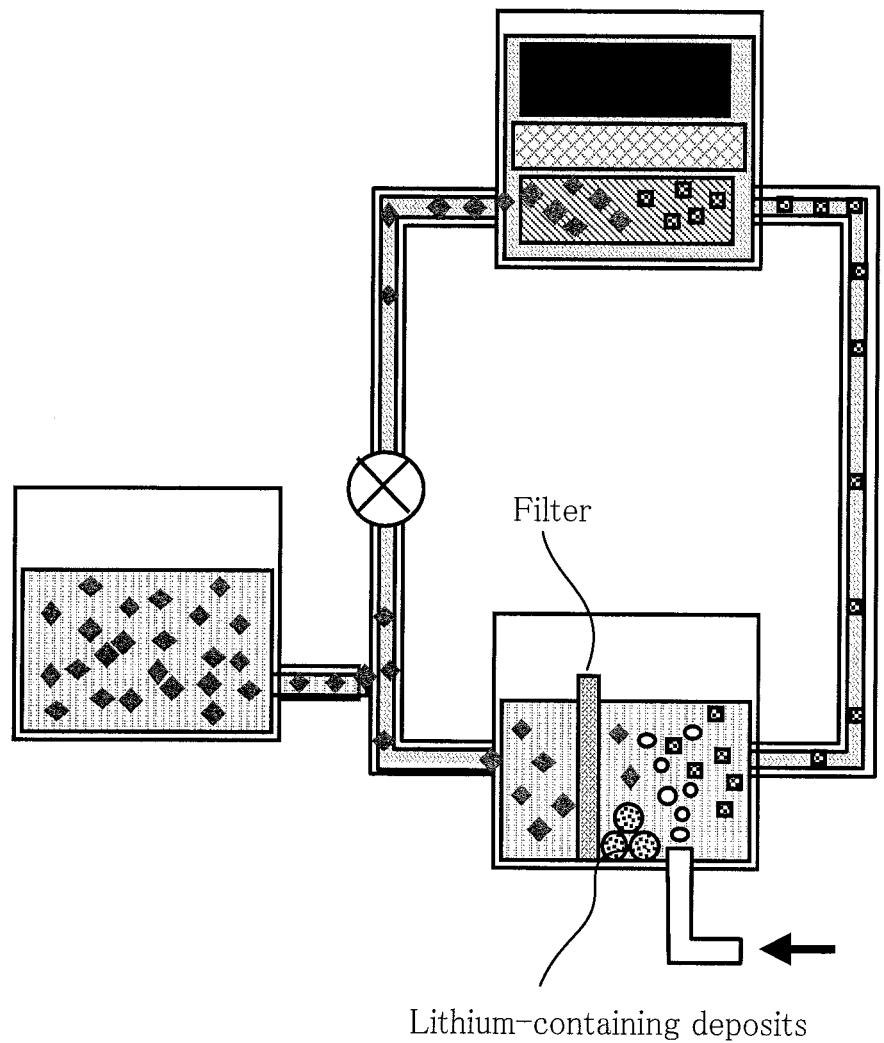
FIG. 3 is a schematic view of a first example of the flow battery according to an embodiment.

When the size of the lithium-containing deposits is in micrometers to millimeters, as shown in FIG. 3, a filter may be disposed in the trap. As the filter, metal mesh, carbon paper, carbon cloth, filter paper or the like may be used.

If the pore diameter or porosity of the filter is too large, the lithium-containing deposits cannot be efficiently trapped. If the pore diameter or porosity is too small, the back pressure of the electrolyte increases. Therefore, the pore diameter and porosity of the filter are determined depending on the size of the lithium-containing deposits and the circulation rate of the electrolyte.

The pore diameter of the filter may be in a range of 500 nm to 2 mm or may be in a range of 1 μm to 5 μm.

The porosity of the filter may be in a range of 50 to 90% or may be in a range of 60 to 80%.

Second Example

Figure 4:
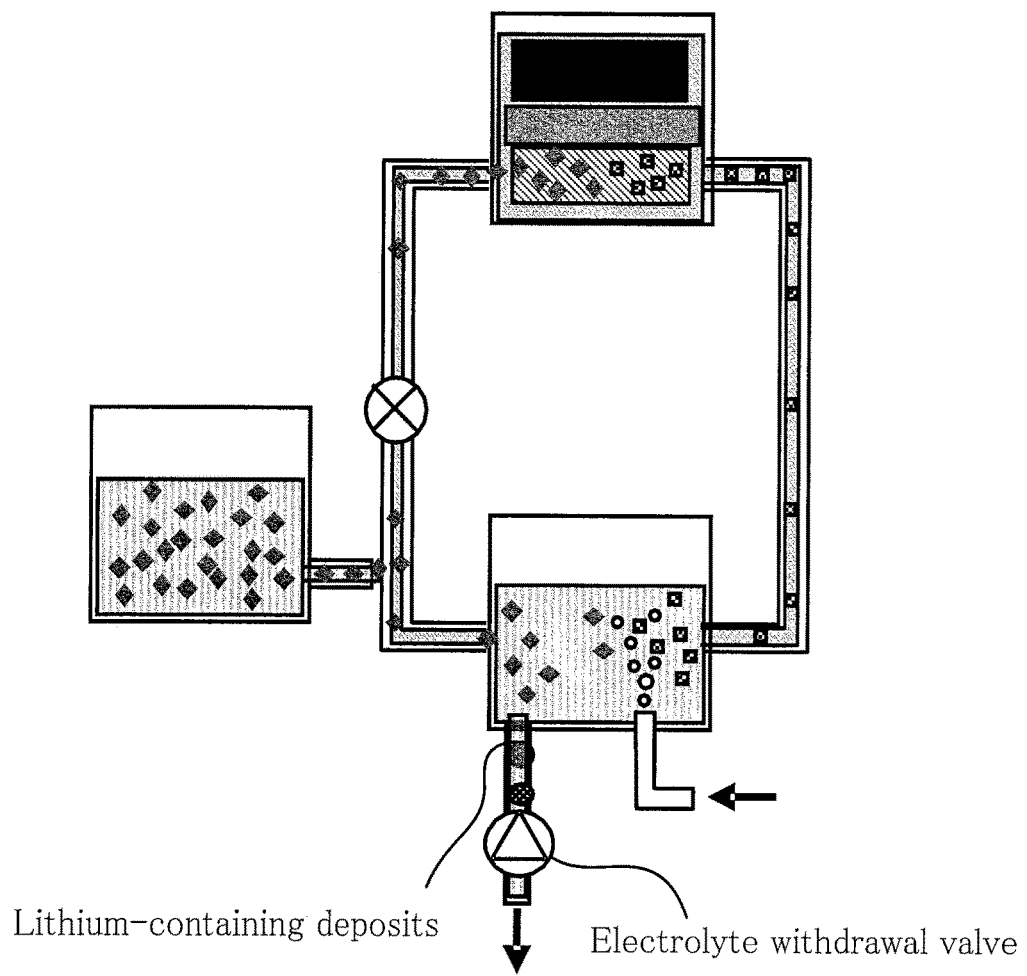
FIG. 4 is a schematic view of a second example of the flow battery according to an embodiment.

When the lithium-containing deposits are submicron or below in size, as shown in FIG. 4, an electrolyte withdrawal valve may be disposed in the trap. In addition to the electrolyte withdrawal valve, a separator for separating the lithium-containing deposits from the withdrawn electrolyte and trapping the separated lithium-containing deposits, may be disposed in the trap. As described above, due to the pore diameter or porosity problem, the filter being able to trap the lithium-containing deposits being submicron in size, increases the back pressure of the electrolyte. Therefore, it is not suitable to dispose the filter in the trap.

Therefore, it is suitable that the electrolyte withdrawal valve is disposed in the trap to withdraw the electrolyte to the outside; the electrolyte and the lithium-containing deposits are separated from each other; and then only the electrolyte is returned to the flow battery.

The electrolyte and the lithium-containing deposits may be separated from each other by any general method for separating solid and liquid from each other, such as centrifugal separation or suction filtration.

An electrolyte container containing the mediator oxidized as above, may be disposed in the second flow channel, because a shortage of the electrolyte caused by the withdrawal can be solved by supplying more electrolyte to the reductor from the electrolyte container. Also, the following constitution may be employed: the electrolyte withdrawn from the electrolyte withdrawal valve to the outside is separated into the electrolyte and the lithium-containing deposits, and then only the electrolyte is returned to the electrolyte container.

Third Example

When the size of the lithium-containing deposits cannot be supposed or varies depending on discharge conditions, as shown in FIG. 1, the filter and the electrolyte withdrawal valve may be disposed in the trap.

As a result, the number of the components constituting the trap is increased, thereby increasing the size of the system. However, it is particularly effective when the flow battery is used under the condition that it is difficult to suppose the type or size of the lithium-containing deposits produced upon the chemical oxidation of the mediator.

The invention claimed is:

1. A flow battery comprising:
an anode comprising an anode current collector having a lithium element on a surface thereof;
a cathode comprising a cathode current collector;
a separator disposed between the anode and the cathode;
an electrolyte comprising a mediator having a function as a redox couple;
a discharger comprising a reductor and an anode chamber, the reductor being defined by the separator, housing the cathode and the electrolyte and being configured to reduce the mediator, and the anode chamber housing the anode defined by the separator;
a first flow channel and a second flow channel, the flow channels being connected to the reductor;
an oxidizer connected to the first and second flow channels and configured to chemically oxidize the mediator; and
a circulator configured to circulate the electrolyte to the reductor, the first flow channel, the oxidizer and the second flow channel in this order,
wherein a trap configured to trap lithium-containing deposits produced with oxidation of the mediator, is disposed in at least a part of the second flow channel or oxidizer.

2. The flow battery according to claim 1, wherein the mediator comprises a vanadium element or iron element.

3. The flow battery according to claim 1, wherein a filter is used in the trap.

4. The flow battery according to claim 1, wherein an electrolyte withdrawal valve configured to withdraw the electrolyte containing the lithium-containing deposits, is used in the trap.

5. The flow battery according to claim 1, wherein the mediator is oxidized by use of an oxygen-containing gas.

6. The flow battery according to claim 5, wherein the electrolyte is a non-aqueous electrolyte containing a catalyst, an organic solvent and the mediator;
wherein the mediator is a polyoxometalate containing vanadium; and
wherein the catalyst is selected from the group consisting of manganese acetate, manganese (II) acetylacetonato, manganese (III) acetylacetonato, copper (I) chloride, scandium trifluoromethanesulfonate, cobalt (II) porphyrin, zinc chloride, iron (II) chloride, manganese (II) chloride, vanadyl acetylacetonato and palladium acetate.

* * * * *